March 5, 1935.  E. K. ROSCHER  1,993,456
RAIL MOTOR VEHICLE FOR HIGH SPEED RAILWAYS
Filed March 18, 1931  3 Sheets-Sheet 1
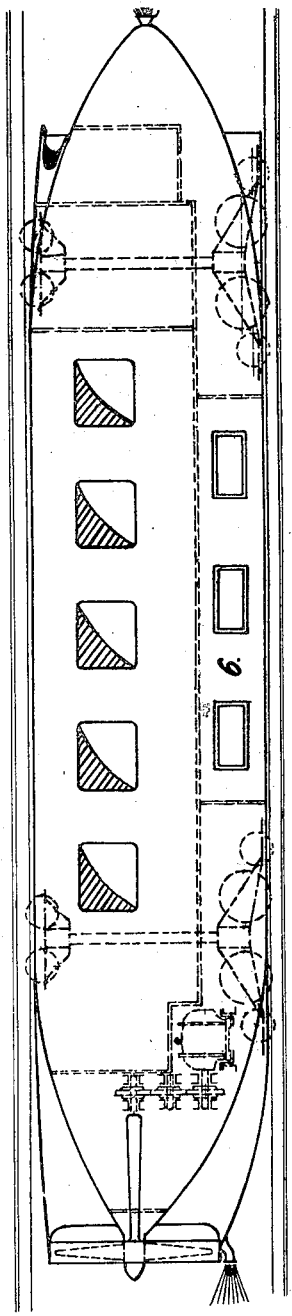
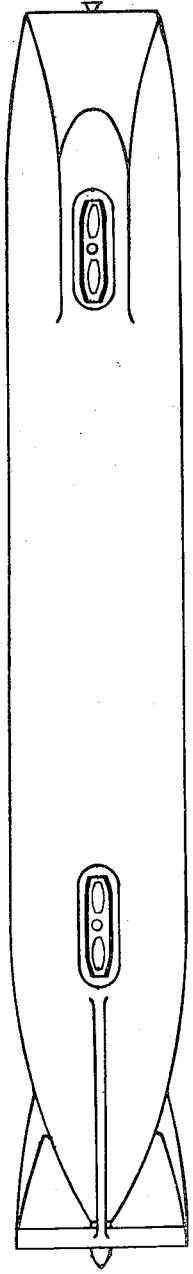
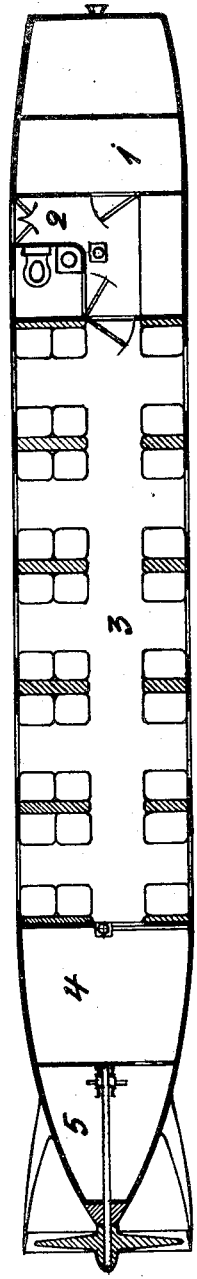

March 5, 1935.  E. K. ROSCHER  1,993,456
RAIL MOTOR VEHICLE FOR HIGH SPEED RAILWAYS
Filed March 18, 1931  3 Sheets-Sheet 2
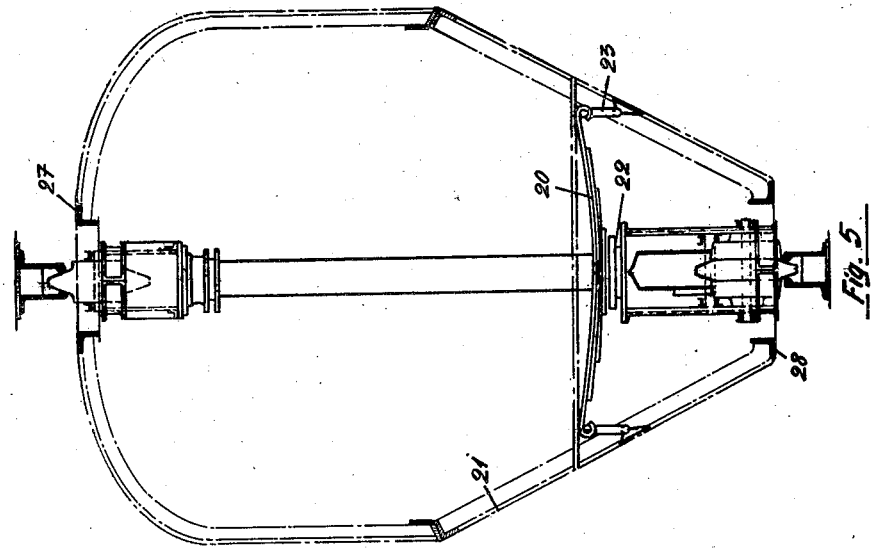
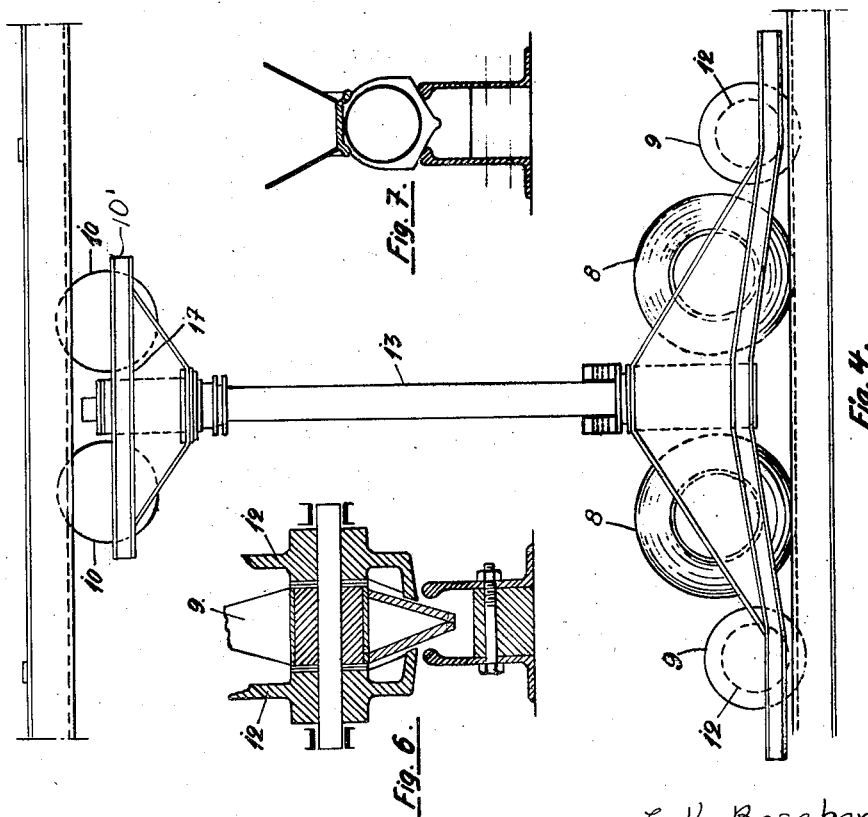
E. K. Roscher
INVENTOR
By: Marks & Clark
ATTYS.

March 5, 1935. E. K. ROSCHER 1,993,456
RAIL MOTOR VEHICLE FOR HIGH SPEED RAILWAYS
Filed March 18, 1931 3 Sheets-Sheet 3
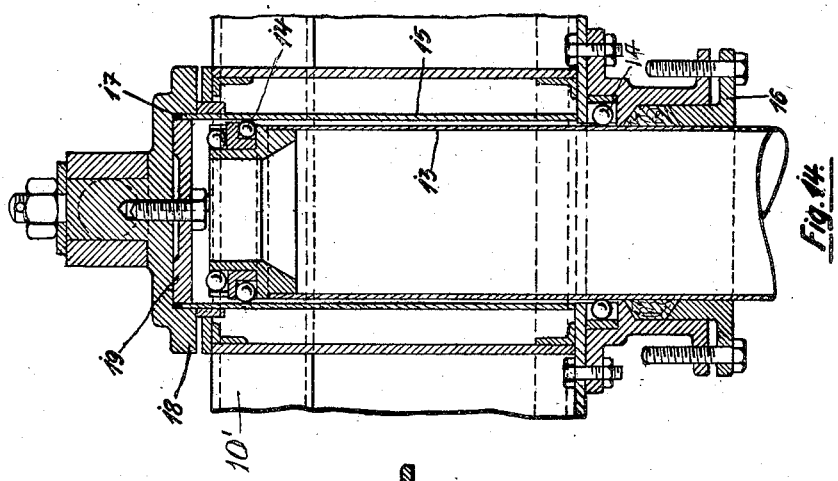
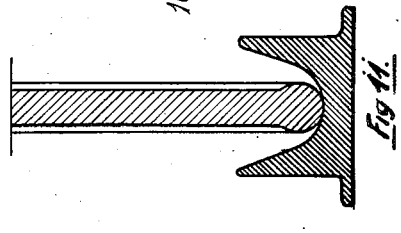
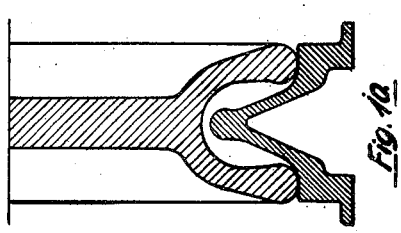
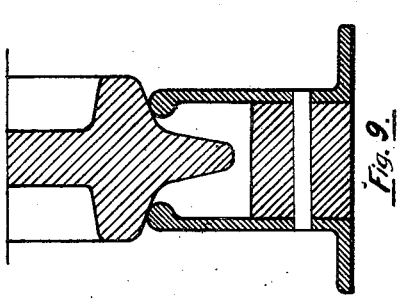
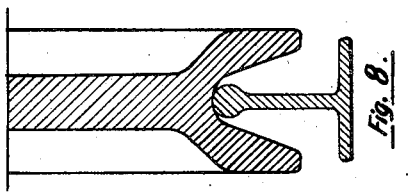
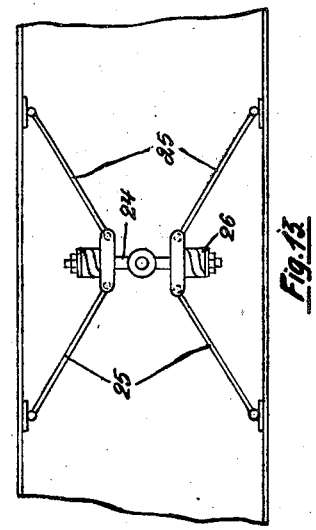
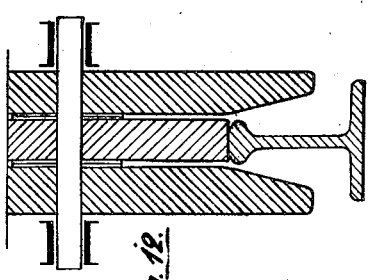

Patented Mar. 5, 1935

1,993,456

UNITED STATES PATENT OFFICE 1,993,456

RAIL MOTOR VEHICLE FOR HIGH-SPEED RAILWAYS

Ernst Karl Roscher, Hamburg-Wandsbek, Germany

Application March 18, 1931, Serial No. 523,571 In Germany December 22, 1930

12 Claims. (Cl. 104—121)

The attempts made to increase the speed of passenger traffic on railways have hitherto led to an increase not only in the driving power of the locomotives or rail motors but also in the unit weight.

The transmission of rather large driving power by the wheels to the rails made this increase in weight necessary. With heavy weights and high speeds, however, is associated a severe stressing of the permanent way, particularly of the rails, and furthermore slight inequalities of the rail guiding at high speeds are liable to lead to derailment in consequence of the momentum of the large masses, so that at the present day the upper limit of speeds possible in practice has apparently been reached.

The attempt to drive rail motor vehicles with air screws, which makes the travelling independent of rail friction, will apparently also soon lead to an upper limit of speed on the normal two-rail track, since for the purpose of reliable guidance in the rail bed there must always be sufficient weight present to ensure the vehicle bearing firmly upon the track.

Reliable guidance of the vehicle at high speeds is only attainable when positive guidance is provided both in a lateral and in a vertical direction. In the case of a vehicle thus guided, moreover, the advantages of a light structure can be fully utilized, and the idea of driving with an air propeller may eventually be rejected in favour of direct wheel drive, if the vehicle is resiliently pressed between the guide rails, so that sufficient rail friction can always be provided for the drive. This resilient (elastic) pressing gives the further possibility, notwithstanding the very light weight of the vehicle, of employing ordinary wheel braking.

The technical advantages of the extensive employment of light construction extend not only to a light and therefore cheap method of constructing the vehicle body, and correspondingly small engine power for the driving, but above all things the permanent way may also be made considerably lighter and therefore cheaper, i. e. on the one hand with respect to the lower static weight, and on the other hand, which is particularly important, with respect to the lower dynamic forces arising from the centrifugal force or shocks of the vehicle in the rail bed, which increase with increasing speed in proportion to the cube of the static masses.

This order of ideas has led to the present invention, which is hereinafter more fully described.

The rail motor is guided between a lower rail bed, which is located underneath the vehicle, and an upper rail bed, which extends above the vehicle with the rail heads turned downwards.

For the principle of the guidance it is in itself immaterial whether the vehicle is guided between four, three, or two rails, which are arranged partly below and partly above.

The simpler arrangement of one rail below and one above, and the small weight of the light vehicle make it appear advantageous, however, only to employ one lower carrying rail and one upper guiding or stabilizing rail.

For the reliable guidance of the vehicle body between the upper and lower rail beds, the following points of view are recognized as decisive and therefore form the kernel of the present invention.

(1) The distance between the lower carrying wheels and the upper supporting wheels must remain constant within such limits that the mutual engagement of rail profile and wheel rim always provides sufficient security against derailment of the vehicle;

(2) In order to compensate for slight irregularities in the positioning of the lower and upper rails as regards their vertical distance from one another, and at the same time to ensure smooth running of the vehicle, the lower and upper wheels, notwithstanding the limitation of their distance apart set forth in the preceding paragraph, must on the one hand render possible a certain vertical yielding, but on the other hand must be pressed as firmly as possible against the lower and upper rail beds;

(3) The clearance or play mentioned in paragraph (2) between the lower and upper wheels can only be permitted within narrow limits, which are not sufficient to combine therewith at the same time an effective springing of the vehicle body, so that separate springing of the latter in relation to the lower and upper wheels or groups of wheels combined into a axle unit will be required;

(4) The rail profiles and the wheel rims, in order to comply with their joint requirements, must be so designed that even with the slight differences in depth of engagement that are still possible, there remains a reliable mutual engagement under all circumstances, and furthermore that even with a varying depth of engagement between the individual wheels and the associated rail profile, for the preventing of wear and additional resistance, as far as possible only point contact should take place;

(5) The reliable guidance in the rails is facilitated by the employment of bogies instead of fixed axles at long distances;

(6) The guidance is further facilitated if shocks to the under frame, produced by slight irregularities, more particularly in the carrying rails, are practically completely obviated by resilient wheels, so that the depths of engagement with the lower and upper guides do not change at all;

(7) In order to enable horizontal variations of direction between the lower and upper rail beds to be easily taken up without shock, it is necessary or desirable that the upper wheels should be able to execute horizontal changes of direction within certain limits relatively to the lower wheels.

All these requirements are taken into consideration, as shown in the ensuing description with reference to the accompanying drawings, by the solutions given by way of example.

Besides the correct designing of the rail structure and of the bogy, the desirable design for the vehicle body is also taken into consideration in the present invention, having regard to the resistance of air, which merits consideration, particularly at great speeds. Not only is it important that the vehicle body itself should have a streamline or torpedo-like shape, but also that the additional air resistances of the appendages, which, as is known in the technology of the flow of fluids, are liable to be considerable, and the eddy and suction effects between the lower edges of the vehicles and the permanent way are precluded as far as possible.

The appendage resistances are obviated by the fact that the vehicle body encloses the wheels and axles practically completely within its torpedo-like form. The suction effect at the bottom or between the permanent way and the under side of the vehicle is mainly obviated by a particularly narrow V-shape cross-sectional form in the lower part of the vehicle body.

The usual torpedo form has the result that at great speeds, at the front portion of the moving body, a strong cushion of air extending in all directions is formed, which gradually flows away to the pointed streamline rear of the moving body, and there relaxes its pressure. This air cushion, when two rapidly moving vehicles pass one another at a high speed on two parallel tracks, comparatively close together, will bring with it the danger that the vehicles may thrust one another out of the rail bed or may drive in the windows. In order to meet this danger it is proposed, as a deviation from the normal torpedo form, to construct the front end of the vehicle body as a wedge with its edge horizontal, so that the air cushion is at first formed mainly above and below the vehicle body.

For the driving of this particularly light high-speed rail vehicle guided above and below there is provided either a direct drive for the wheels by means of an electric motor or an internal combustion engine, which is possible owing to the above-mentioned provision for rail friction by permanently pressing the wheels against the rails, or else the driving is effected by means of an air propeller, which in its turn is driven by a motor, and transmits its propelling force by a thrust bearing through the vehicle body to the wheels.

Braking is effected on the one hand by means of band brakes or shoe brakes on the wheels, and on the other hand, in the case of electric motors, by short-circuiting, or in the case of the propeller drive by reversing the direction of rotation of the propeller.

For the protection of the public when the vehicle is entering and leaving railway stations it is proposed to surround the propeller with a protective ring outside its blade tips, and this ring may advantageously also be given a streamline cross section, and may even be employed for exerting a nozzle-like guiding action upon the current of air in front and behind the propeller.

In order to enable the possibilities of the light construction to be fully utilized, it is finally also provided that instead of the light body construction hitherto usual in connection with a comparatively heavy underframe, the entire body of the vehicle is to be adapted for taking up longitudinal stresses, so that in the absence of the heavy supporting underframe the longitudinal stresses in the vehicle are taken up partly by connections (booms) of the bottom or lower half of the vehicle and partly by connections of the top or upper half of the vehicle, whereby the girder height is considerably increased, and therefore particular light longitudinal profiles can be employed.

The invention is illustrated by way of example in the accompanying drawings, in which Figure 1 is a side view,

Figure 2 a plan,

Figure 3 a horizontal section of the high-speed vehicle.

Fig. 4 is a side view of the axle frame constructed as a bogy,

Fig. 5 is an end view of the arrangement shown in Fig. 4,

Figs. 6, 7, 8, 9, 10, 11 and 12 are fragmentary transverse sectional views through various forms of guide wheels and associated rail profiles, Fig. 13 is a plan detail, and Fig. 14 is an enlarged vertical sectional view through the column head and the yoke.

Figure 1 shows the axle-frames, with the lower and upper wheels, which, together with the wheels themselves, are enclosed by the streamline car body. The axle-frames are here shown as bogies, and for the driving thereof there is provided in this case a propeller drive, with an electric motor, and the provision of a protective ring, which may be in the form of a nozzle, round the tips of the propeller blades is also to be seen in all three figures. Furthermore the upper and lower holders of the ring are designed as stabilizing surfaces against lateral movements of the vehicle, and also if desired as air guide surfaces to the propeller.

Figure 2 shows in conjunction with Figure 1 the streamline form and in particular the shaping of the front portion of the vehicle body in the form of a chisel with its edge horizontal.

Figure 3 illustrates the possibilities of accommodating passengers and others, containing:—A room 1 for the driver, a room 2, which is the vestibule with accommodation for luggage and lavatory accommodation, a room 3 which is the passengers' saloon, a room 4 which is available for luggage, mails or for a pantry, and a room 5 which is the engine room. Furthermore in the room denoted by 6 in Figure 1 accommodation may be provided for letter and parcel post.

Figure 4 shows a side view of the axle frame, constructed as a bogy, forming one axle unit between the lower carrying wheels 8 and the upper supporting wheels 10. The carrying wheels 8 are designed as pneumatic tyre wheels, with a cross section, as shown in Figure 7, while the wheels 9 with a cross section, as shown in Figure 6, are normally merely guiding wheels, for the purpose of reliably guiding the pneumatic tyres on the grooved rail, which is composed of two rail elements.

In the event of air escaping from the wheels 8, the central wedge-shaped guide wheel 9 of the wheel group consisting of the wheels 9 and 12 combined on one axle, as shown in Figure 6, is enclosed at the sides by the two spare carrying wheels 12, which normally do not come into contact with the rails, but are capable of transmitting the load on the bogy to the rails in the event of the pressure in the pneumatic tyres falling.

The upper supporting wheels, denoted by 10, are in the present case designed with a cross section, as shown in Figure 9, but may if preferred be of some other cross section, provided an appropriate rail section is adopted, as illustrated for example in Figures 6, 8, 9, 10, 11 and 12.

The supporting column 13 of the axle-unit is rigidly connected with the lower bearing bracket for the wheels 8, 9 and 12, while the upper bearing bracket 10' for the wheels 10 is so fitted as to be movable to some extent both in a horizontal direction round the column and in a vertical direction upon it.

Figure 14 shows a section through the upper part of the column 13, with the upper bearing bracket 10' mounted upon it at the top. The drawings show that the column 13, with a ball-bearing 14, is so supported as to be horizontally rotatable in a truncated column 15. This truncated column is rigidly connected with the upper bearing bracket 10'. A stuffing box 16 closes the space between the columns 13 and 15 in an air-tight manner at the bottom, while a cylindrical cover 17, with packing, closes the truncated column in an air-tight manner at the top. In this manner it is possible to fill the space between the columns 13 and 15, and even the entire column 13 with compressed air, whereby the upper bearing bracket, with the wheels 10, is always pressed firmly and at the same time yieldingly against the upper supporting rail. The truncated column 15 then moves in a vertical direction upon the column 13. In the event of the air pressure failing from any cause, or in the event of exceptionally heavy vertical shocks occurring, a ball-thrust bearing 18 with an abutment 19 is provided, which are normally not in engagement with one another but are separated by a distance of from 10 to 15 millimetres.

Figure 5 shows a view of the frame 2 according to Figure 4 looked at in the direction of travelling. As will be readily understood the vehicle body 21 is suspended by carrying springs 20 from the bogy, so as to be resilient in a vertical direction. The horizontal rotation of the bogy is effected by means of a carrying and footstep bearing 22, which is interposed between the carrying springs and the lower bearing bracket.

The lateral springing of the lower portion of the vehicle body may be effected for example by means of shackles 23 on the carrying springs 20.

The upper portion of the carrying column is laterally sprung in relation to the vehicle body by means of an arrangement, as shown by way of example in plan in Figure 13.

The yoke 24 there illustrated is shackled on to the column head on the cover 17, as shown in Figures 14 and 4, and is connected by rodding 25 with the longitudinal bonds of the vehicle body. The springing is effected by means of buffer springs 26.

The outline of the profile of the vehicle body 21, as shown in Figure 5, indicates that the vehicle body is narrow in the lower portion and is wedge-shaped for the purpose of obviating the formation of air eddies between the permanent way and the vehicle body.

Finally, Figures 6, 7, 8, 9, 10, 11 and 12 show a number of constructional possibilities for the guide wheels and the associated rail profiles. In all these cases it will be recognized that even when the depth of engagement between the wheel and the rail varies, only point contact takes place, except that in some cases, as illustrated for example in Figs. 9 and 10, contact takes place at two points on the wheel rim simultaneously, but in these instances the contact takes place at the same radius.

Attention is directed to the fact that the means for allowing a limited resilient yielding motion of the rims of the upper and lower wheels as to respective greatest distance from each other so as to yieldingly hold the wheels in engagement with the two tracks consisting either of the hydraulic cylinder (13, 15) of Fig. 14 or the resilient wheel 9 of Fig. 6.

What I claim is:—

1. A motor driven railway car of the type operating between a lower carrying track and an upper stabilizing track and having a column arranged vertically through a car body and having a bogie connected to the column and resiliently supporting the body and having carrying wheels thereon operating on the lower track, and an upper bogie including a carrying member, stabilizing wheels on said member operating on the stabilizing track and means for rotatably and yieldingly mounting the member on the upper end of the column so as to yieldingly hold the stabilizing wheels in engagement with the track.

2. A motor driven railway car as claimed in claim 1 wherein axles are arranged transversely of the carrying member so that the wheels engage the under surface of the stabilizing track.

3. A motor driven railway car as claimed in claim 1 wherein resilient means is provided between the last mentioned mounting means and the car body for taking up lateral shocks.

4. A motor driven railway car as claimed in claim 1, wherein the mounting means includes a cylinder fixed on the carrying member and telescoping about the top of the column, a cover on the cylinder forming an air tight closure for the column, and packing means between the bottom of the carrying member and the column.

5. A motor driven railway car as claimed in claim 1, wherein resilient means is arranged between the last mentioned mounting means and the car body for taking up lateral shocks and including a supporting member mounted on said mounting means, yokes on said member, links between said yokes and the sides of the car body and buffer springs on said member associated with said yokes.

6. A motor driven railway car of the type operating between a lower carrying track and an upper stabilizing track comprising two vertically sliding columns arranged through the car body, means for hanging the car body resiliently at the lower part of said columns, lower and upper carrying members fitted to the respective ends of each column, lower carrying wheels on the lower members operating on the carrying track, and stabilizing wheels on the upper members engaging the running surface of the stabilizing track from below, said columns being further mounted so that they can turn with respect to the longitudinal axis of the car body, means for allowing a limited resilient yielding motion of the rims of the upper and lower wheels as to their respective greatest vertical distance from each other so as to yieldingly hold the wheels in engagement with the two tracks and yet to prevent the danger of derailment.

7. A motor driven railway car as claimed in claim 6, wherein the carrying members for the stabilizing wheels are rotatably and yieldingly mounted on the upper end of the columns.

8. A motor driven railway car as claimed in claim 6, wherein the carrying members for the stabilizing wheels are rotatably and yieldingly mounted on the upper end of the columns the mounting means include a cylinder fixed on the carrying member and telescoped about the top of the column, a cover on the cylinder forming an air-tight closure for the column, and packing means between the bottom of the carrying member and the column.

9. A motor driven railway car as claimed in claim 6, wherein the means for allowing the limited vertical yielding motion of the rims of the wheels as to their respective greatest vertical distance from each other consists of resilient wheels.

10. A motor driven railway car as claimed in claim 6, wherein the wheels have lateral wheel rims rotating independently about the same axle as the central running sheave of the wheel.

11. A motor driven railway car as claimed in claim 6, wherein resilient means are provided between the upper ends of the columns and the car body for taking up lateral shocks.

12. A motor driven railway car as claimed in claim 6, wherein resilient means are arranged between the upper end of the columns and the car body for taking up lateral shocks and including a supporting member, yokes on said member, links between said yokes and the sides of the car body and buffer springs on said member associated with said yokes.

ERNST KARL ROSCHER.